Nov. 26, 1946.    E. G. GUNN    2,411,539
LIQUID FILTER INSTALLATION
Filed May 10, 1944    3 Sheets-Sheet 1
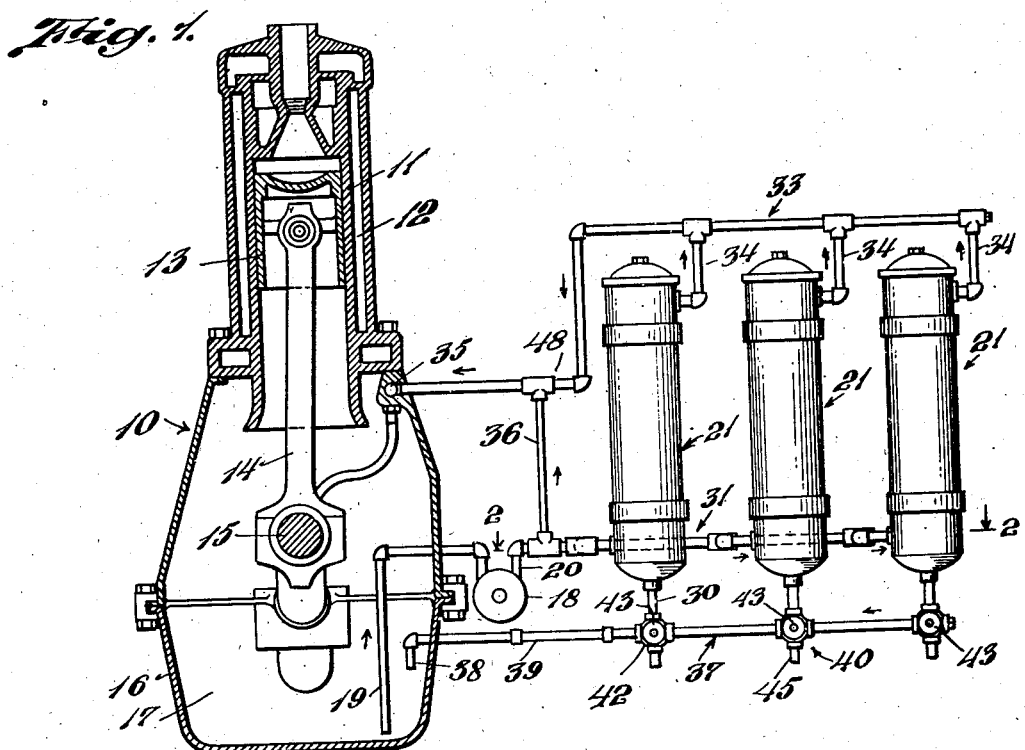
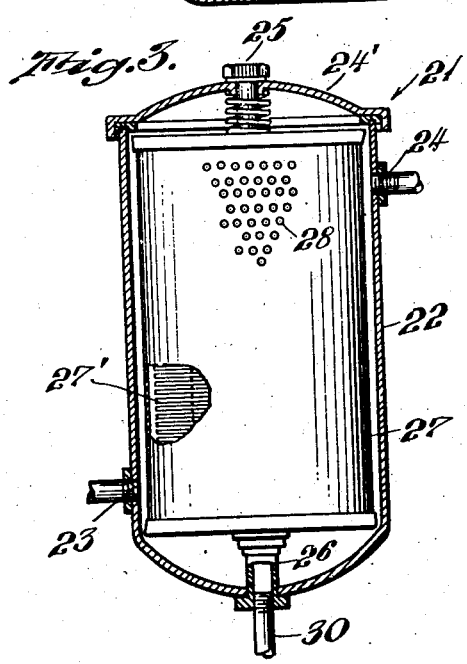
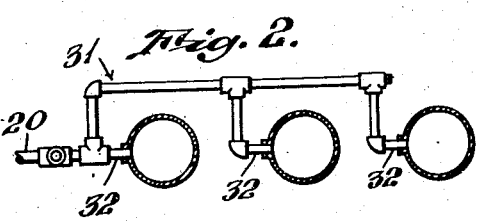
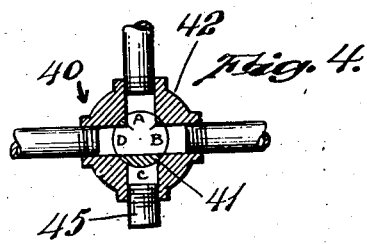
INVENTOR
Earl G. Gunn
BY Barlow & Barlow
ATTORNEYS

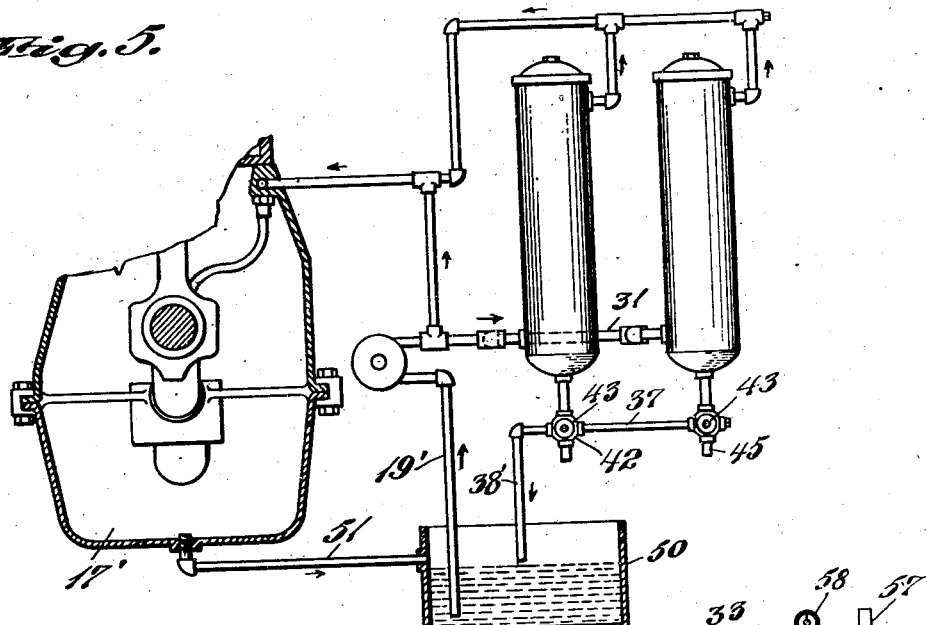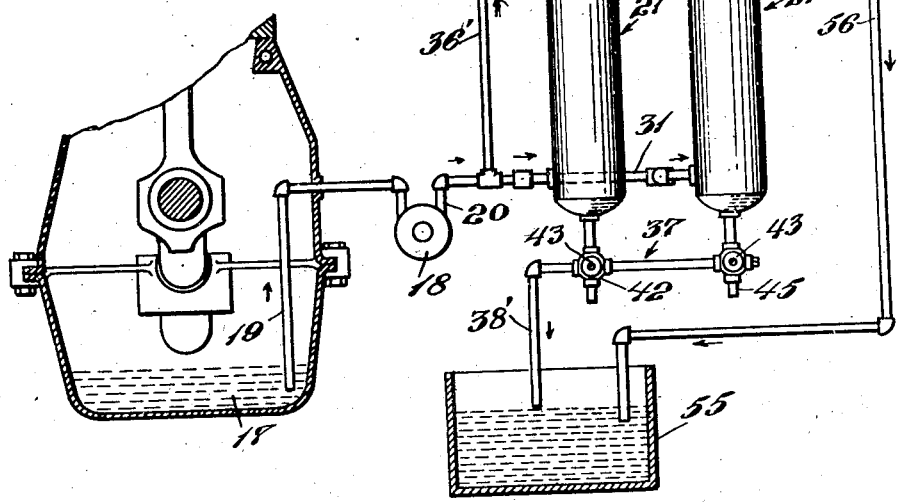

Nov. 26, 1946. E. G. GUNN 2,411,539
LIQUID FILTER INSTALLATION
Filed May 10, 1944 3 Sheets-Sheet 3

INVENTOR
Earl G. Gunn
BY Barlow & Barlow
ATTORNEYS

Patented Nov. 26, 1946

2,411,539

UNITED STATES PATENT OFFICE 2,411,539

LIQUID FILTER INSTALLATION

Earl G. Gunn, Providence, R. I., assignor to Fram Corporation, a corporation of Rhode Island Application May 10, 1944, Serial No. 534,929

6 Claims. (Cl. 184—6)

This invention relates to the installation of a filter.

In the use of a filter of the type installed for the filtering of lubricant in an internal combustion engine, it is frequently difficult to keep the filter warm where flow is slow and also difficult to determine the condition of the filter and especially is this true where a series of filters are hooked up in a parallel relation.

One of the objects of this invention is to arrange a filter for removing from the liquid substantially all of the filterable material in a single pass.

Another object of this invention is to keep a filter warm where the liquid to be filtered is considerably above room temperature by use of the warm liquid which is to be filtered especially where the filtrate passes rather slowly through the filter.

Another object of this invention is to provide a filter and conduits thereto so that the filtered oil may be bled or examined in its return to the reservoir whereby the condition of this filtered oil may be determined and from this condition one may judge whether the filter has reached its contaminant collecting capacity.

Another object of this invention is to so arrange the conduit system that any one of a plurality of filters connected in parallel relation may be tested in this manner.

With these and other objects in view, the invention consists of certain novel features of construction, as will be more fully described and particularly pointed out in the appended claims.

In the accompanying drawings:

Fig. 1 is a diagrammatic view illustrating in section a part of an internal combustion engine and also illustrating a plurality of filter units connected in parallel with relation to the oil sump of the engine;

Fig. 2 is a view taken on substantially line 2—2 of Fig. 1;

Fig. 3 is a sectional view of the filter unit;

Fig. 4 is a sectional view of a conduit control in the flow line of the system;

Figure 7:
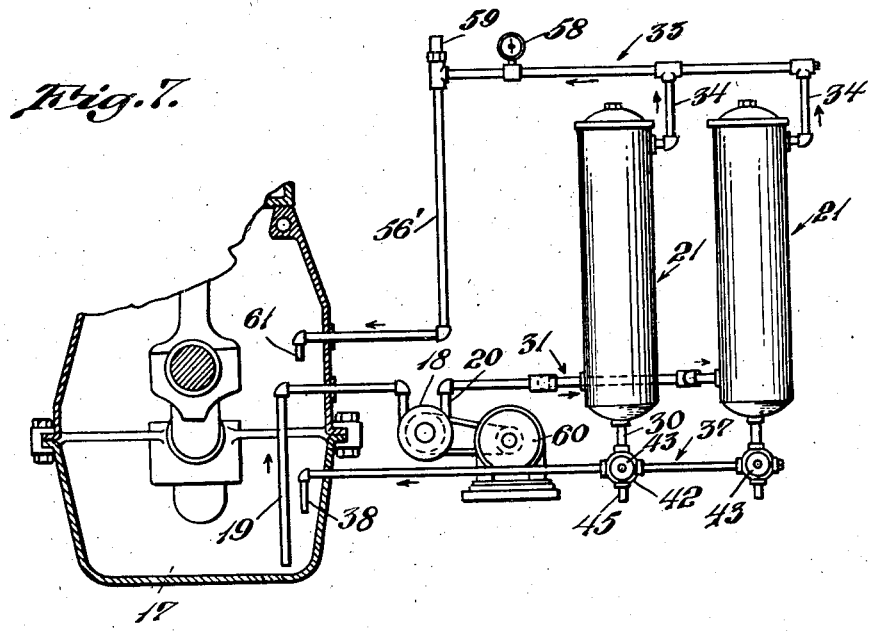

Figs. 5, 6, 7, and 8 are views similar to Fig. 1 but illustrating different modified arrangements.

In carrying out this invention I utilize a filter unit of the type wherein the liquid is filtered by a single pass of the liquid through the filter unit. More specifically the type of unit which I utilize is that illustrated in the application of Richard V. Hicks, Serial No. 494,223 filed July 10, 1943. The filter case provides an arrangement so that oil may enter and leave the case without being filtered which maintains circulation to keep the whole warm while the oil that is filtered will move inwardly through the filter medium and leave the unit through the center thereof. The casing itself thus may be connected so that it forms a by-pass for the oil which may be supplied under pressure while the clean oil is separately conducted back to the reservoir. Suitable controls are inserted that the clean oil may be either bled or so controlled in its flow that where a plurality of units are used any one of the units may be selected for bleeding whereby the clean oil that it is passing may be examined. A transparent section may be inserted for examination where desired.

With reference to the drawings, 10 designates generally an internal combustion engine disclosing a cylinder 11, water jacketed as at 12 with a piston 13 in this cylinder having a connecting rod 14 connecting it to the crank shaft 15 which is housed by casing 16 providing a sump 17 for containing the lubricating oil. A pump for the circulation of this oil is designated 18 which will draw oil through the conduit 19 from the sump 17 and discharge it through the conduit 20 under pressure through the filter units designated generally 21 which may be arranged in a battery of any number and hooked up in parallel relation.

Each of these filter units as shown in greater detail in Fig. 3 comprises a casing 22 of a suitable cross sectional shape, the shape here shown being for illustration cylindrical, with an inlet opening 23 at one end and a similar opening 24 adjacent its other end. A cover 24' for this case is provided and may be held in place by a bolt 25 which threads into a center tube 26 about which the removable cartridge 27 is located. This cartridge 27 is of a shape similar to the casing having perforations in its cylindrical wall 28 while its ends are imperforate and are sealed with the tube 26 so that oil cannot pass into the center tube at either end of the cartridge. The arrangement is such that filtrate may pass laterally from the outside of the cartridge inwardly through the filter medium 27' and enter the center tube 26 where it is discharged through a conduit 30 leaving the filterable material in the filter medium in a single pass of the liquid therethrough as distinguished from repeated passes in some filters. The filter medium consists of a plurality of disks 27' more specifically described in the above-mentioned Hicks application Serial No. 494,223. The arrangement is such that the filtrate or filtered oil enters the center tube to discharge downwardly through the conduit 30.

In the cases where the lubricating oil is 50° F. or more above room temperature, the pressure conduit 20 from the pump 18 is connected to a header 31 which in turn is connected to each of the openings 23 of the filter unit by a conduit 32. An upper header designated generally 33 is connected to each of the upper openings 24 by a conduit 34 while this header joins the oil head 35 in the engine block. The header 31 is connected directly to the header 33 by a conduit 36 of smaller internal diameter than the diameter of the conduit 20, 31, or 33. A common return pipe or conduit 37 collects clean oil from the conduits 30 and returns it to the sump through its discharge 38. A glass tube 39 may be inserted in this conduit that the condition of the filtered oil may be observed.

A control 40, shown in greater detail in Fig. 4, is placed at the junction of the conduits 30 and 37 and comprises a valve 41 which may be rotated in its body portion 42 so as to block off any one of the four lines or conduits A, B, C, D, which extend outwardly at 90° apart from the center of this body. A suitable handle 43 is provided for rotating this valve to the desired position.

Pump 18 will draw lubricant from the sump 17 and force it under pressure into each of the casings from the header 31. Some of this oil will pass upwardly through the casing or unit, by-passing the filter 27, and passing outwardly through the conduit 34 to the header 33 and then back to the header 35. This circulation will maintain the filter warm. The conduit 37 and center tube 26 will be at zero pressure and consequently some of the oil under pressure will pass through the filter medium 27' and into the center tube 26 and thence downwardly through the conduit 30 into the return conduit 37 and thence back to the sump as at 38. This oil will be cleaned in a single pass through the filter. If it is desired to determine the condition of the oil returned from the entire battery of filter casings, it may be observed at the glass 39, or if it is desired to tap oil from all of the filter batteries the valve below the casing nearest to the reservoir will be turned to position D (see Fig. 4) when oil entering through positions A and B will be discharged through position C and out of the tap 45.

If it is desired to tap oil from all but this particular casing then the closure will be moved to position A. If it is desired to tap oil from only this particular unit the closure will be moved to position B. It will be readily apparent that any selected group of filters may be tested by use of a valve of this character or any particular unit may be tested by suitable manipulations of the valves of the various units which go to form up the battery.

If dirty oil is coming from any one of the filter units, it will be observed and the cartridge therein may be replaced.

Figure 8:
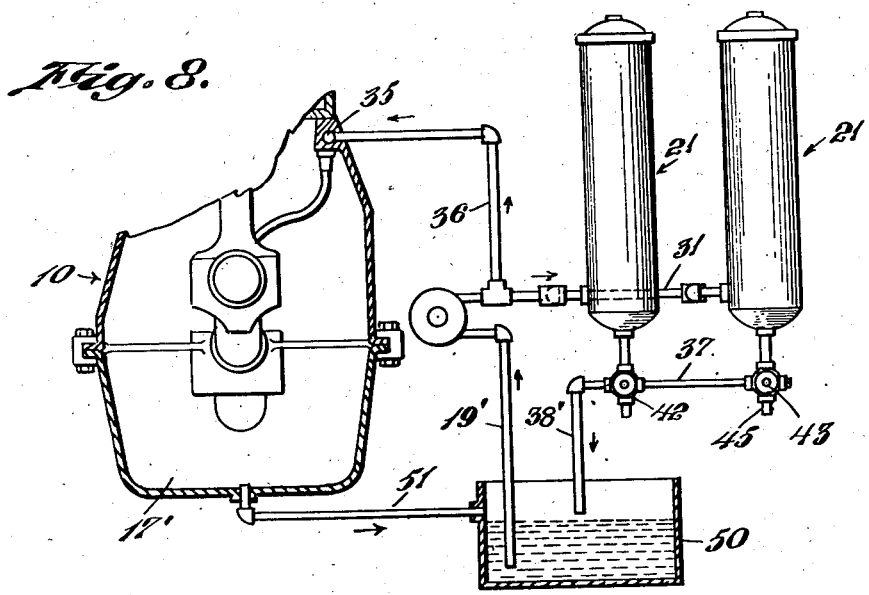

In some cases where it is unnecessary to warm the filter, the header 33 and the conduits 34 may be omitted from the point 48 of the connection of the conduit 36 so that a by-pass relationship in the filter unit 21 is not used as shown in Fig. 8. In this case all by-passing will occur outside of the filter unit and such pressure as occurs in the filter unit will cause the oil therein to be passed through the filtering medium and the filtrate to be discharged through the conduit 30.

In Fig. 5 I have illustrated an arrangement which is similar to the showing in Fig. 1 except that a separate sump 50 is provided and a conduit 51 conducts oil from the sump 17' of the engine to the sump 50. This arrangement provides a dry sump in the engine crank case. Corresponding parts are designated by the same reference characters where they are identical with Fig. 1 or with the same reference characters with a prime added where they are similar in function but not identical in shape, length or size.

In Fig. 6 I have illustrated filtration for the lubricant in a scavenger circuit. This circuit may be used regardless of the oil temperature. The pump 18 will draw the liquid through the conduit 19 from the sump 17 and conduct it through the conduit 20 and header 31 to the filter unit 21 and to the header 33 in the same manner as illustrated in Fig. 1. The conduit 36' will be of a size smaller than the conduits of the headers 31 and 33 and by this shunt arrangement turbulence in the filter is minimized. Separate sump 55 is provided and a conduit 56 extends from the header 33 to this sump. A pressure regulator valve valve 57 may be placed in this conduit as well as a pressure gage 58. The same arrangement for the discharge of clean oil which is passed through the filter is illustrated in Fig. 6 as in Fig. 5, there being conduit 37 in which the various valves 42 are provided which have their taps 45, the discharge spout being designated 38'.

In Fig. 7 I have illustrated a sump 17 of an internal combustion engine but from its arrangement it is quite evident that filtration is not particularly connected with the engine and might be arranged for the filtration of oil from sump entirely separate from the engine. The pump 18 is driven from a motor 60 and draws oil from sump 17 to the conduit 19, discharging through the conduit 20 to a header 31 which supplies the filter casings 21. The header 33 is connected to the casing as at 34 similarly as heretofore described and includes a pressure gage 58 and pressure regulator valve 59, while the conduit 56' returns to the sump discharging as at 61. Clean oil is collected by a conduit 37 from each of the filters as at 30 through the control valves 42 having taps 45 while it is connected back to the sump through the discharge 38.

The operation of the various flow circuits illustrated will be clear from the description of the circuit given in Fig. 1. By-passing the oil through the filter casing will cause it to be warmed up and the oil becomes warm so that better operation may be had. By the use of the pressure gage pressure on the oil may be observed at all times while by the use of the pressure regulator valve the flow of the oil may be checked or controlled at certain desired pressure.

It will be observed that the liquid supplied by the pump in each of the various modifications except Figures 6 and 7 passes into the lubricating system of the internal combustion engine, with the exception of the filtrate or amount of lubricant which passes through the filter medium and returns to the lubricant reservoir.

I claim:

1. In combination with an internal combustion engine, having a circulating lubricating system, including a reservoir for lubricant which may be contaminated, a pump to withdraw lubricant therefrom and circulate the same to a point of use, eventually returning the lubricant to the reservoir, a filtering unit comprising a casing in said circulating system, having continually open inlet and outlet conduits through which lubricant flows to the point of use by the action of said pump and by-passing the filtering element, a filtering element in said casing through which filtrate passes from the lubricant and a separate conduit to return said filtrate to said reservoir.

2. The combination set forth in claim 1, wherein said filtering unit is in shunt relation to said pump circulated lubricating system.

3. The combination set forth in claim 1, wherein a continually open conduit connects said inlet and outlet conduits to place said filtering unit in shunt relation to said pump circulated lubricating system.

4. The combination set forth in claim 1, wherein a continually open but restricted conduit connects said inlet and outlet conduits to place said filtering unit in shunt relation to said pump circulated lubricating system.

5. The combination set forth in claim 1, wherein said filtering unit comprises a plurality of filters arranged in parallel relation.

6. The combination set forth in claim 1, wherein the lubricant reservoir is the crankcase sump.

EARL G. GUNN.